(12) United States Patent
D'Acquisto

(10) Patent No.: US 10,834,916 B2
(45) Date of Patent: Nov. 17, 2020

(54) CAMERA MOUNT

(71) Applicant: Andrae T. D'Acquisto, Bellevue, IA (US)

(72) Inventor: Andrae T. D'Acquisto, Bellevue, IA (US)

( * ) Notice: Subject to any disclaimer, the term of this patent is extended or adjusted under 35 U.S.C. 154(b) by 43 days.

(21) Appl. No.: 16/243,493

(22) Filed: Jan. 9, 2019

(65) Prior Publication Data

US 2019/0208765 A1 Jul. 11, 2019

Related U.S. Application Data

(60) Provisional application No. 62/615,423, filed on Jan. 9, 2018, provisional application No. 62/615,417, filed on Jan. 9, 2018.

(51) Int. Cl.
| | |
|---|---|
| *G03B 17/56* | (2006.01) |
| *F16M 13/02* | (2006.01) |
| *A01M 31/00* | (2006.01) |
| *F16C 11/06* | (2006.01) |
| *A01K 29/00* | (2006.01) |
| *H04N 5/225* | (2006.01) |
| *F41H 3/00* | (2006.01) |

(52) U.S. Cl.
CPC ......... *A01M 31/002* (2013.01); *A01K 29/005* (2013.01); *F16C 11/06* (2013.01); *F16M 13/02* (2013.01); *F41H 3/00* (2013.01); *G03B 17/56* (2013.01); *G03B 17/561* (2013.01); *H04N 5/2251* (2013.01); *H04N 5/2253* (2013.01)

(58) Field of Classification Search
CPC .......... G03B 17/56–561; A01K 29/005; H04N 5/2253
See application file for complete search history.

(56) References Cited

U.S. PATENT DOCUMENTS

| | | | |
|---|---|---|---|
| 6,449,431 B1 * | 9/2002 | Cuddeback | A01M 31/002 396/27 |
| 9,377,156 B2 * | 6/2016 | Wong | F16M 11/14 |
| 9,611,978 B2 * | 4/2017 | Manniche | F16M 13/022 |
| 2009/0196597 A1 * | 8/2009 | Messinger | F16M 13/02 396/427 |
| 2018/0109704 A1 * | 4/2018 | Gilbert | G03B 17/561 |

* cited by examiner

*Primary Examiner* — Minh Q Phan
(74) *Attorney, Agent, or Firm* — Ryan Kromholz; Manion, S.C.

(57) ABSTRACT

A camera mount may include a base member having a rear face to face a support structure and a front face, the front face a curved guide surface, a camera support having a rear face facing the front face of the base member, the rear face of the camera support comprising a guide abutting surface and a retainer resiliently biasing the guide abutting surface against the curved guide surface to releasably retain the camera support at one of a plurality of different positions along the curved guide surface and at one of a plurality of different available orientations relative to the support structure.

3 Claims, 8 Drawing Sheets

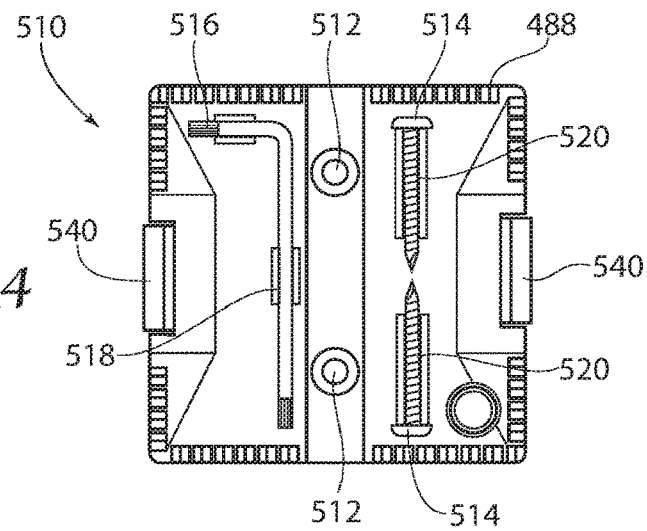
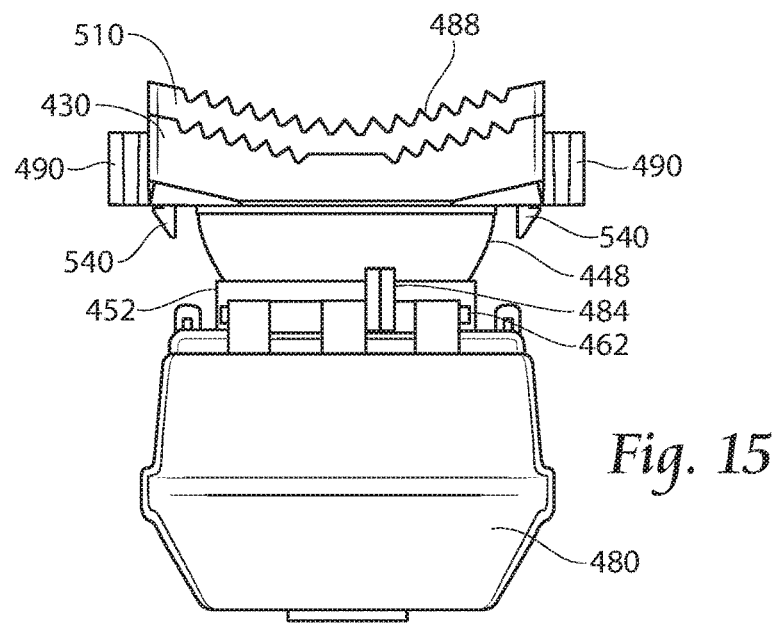
Fig. 14
Fig. 15
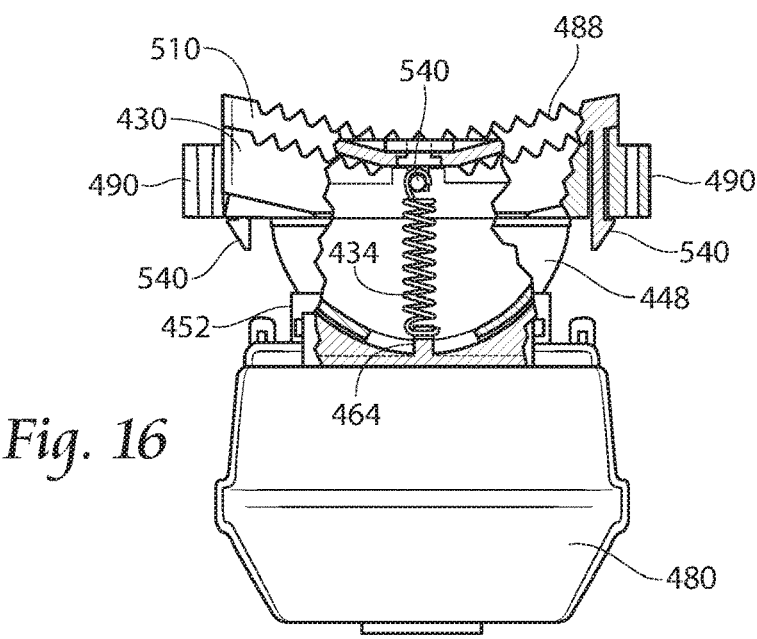
Fig. 16

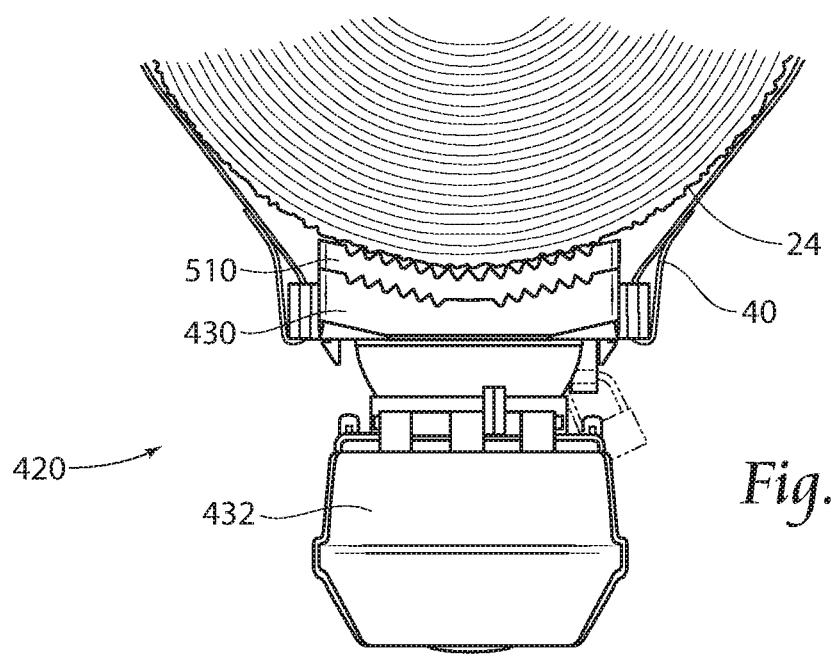
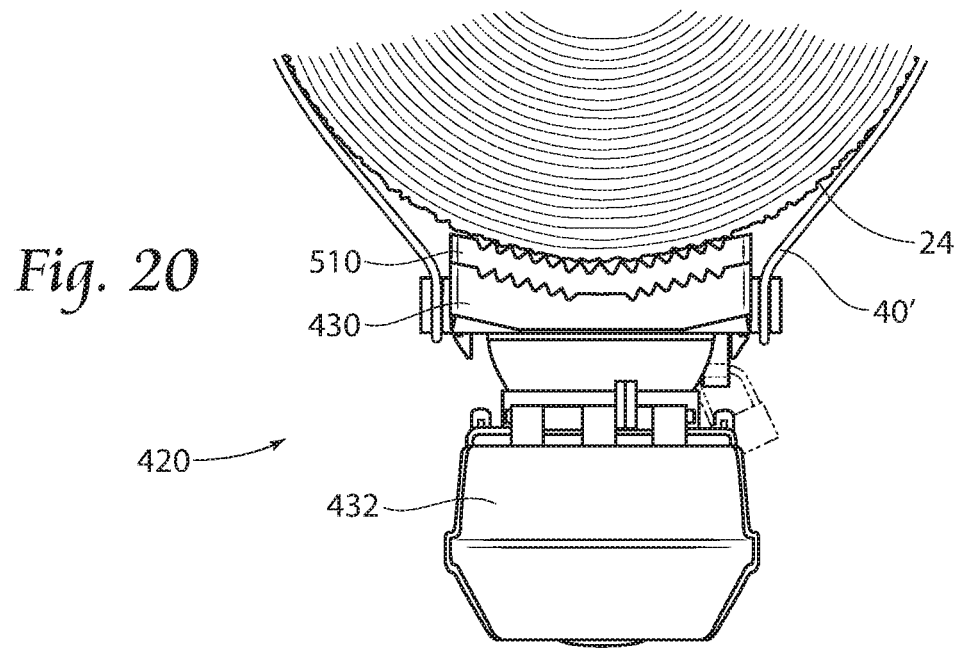

Lock and cable (optional)

US 10,834,916 B2

CAMERA MOUNT

RELATED APPLICATIONS

This application claims the benefit of U.S. Provisional Patent Application Ser. No. 62/615,423, filed 9 Jan. 2018 and U.S. Provisional Patent Application Ser. No. 62/615,417, filed 9 Jan. 2018.

BACKGROUND OF THE INVENTION

Cameras are sometimes mounted or secured to trees or other supporting structures for purposes such as wildlife observation.

SUMMARY OF THE INVENTION

Disclosed herein are example camera mounts that facilitate securement of a camera to a supporting structure, such as a tree, without being restricted or limited by the angle at which the supporting structure or tree extends. Disclosed herein are example camera mounts that provide the supported camera with a plurality of different available orientations or angles relative to the supporting structure. Disclosed herein are example camera mounts that are easy to assemble and disassemble, that are less complex and costly and that are compact so as to better hug or follow the profile of the tree or supporting structure so as to be less conspicuous to the wildlife being observed.

Disclosed herein are example camera mounts that may include a base member having a rear face to face a support structure and a front face, the front face a curved guide surface, a camera support having a rear face facing the front face of the base member, the rear face of the camera support comprising a guide abutting surface and a spring resiliently biasing the guide abutting surface against the curved guide surface to releasably retain the camera support at one of a plurality of different positions along the curved guide surface and at one of a plurality of different available orientations relative to the support structure.

Disclosed herein are example camera mounts that may include a ball or a portion of a ball and a socket having a minority spherical surface that receives the ball or the portion of the ball, wherein the ball or the portion of the ball rotates within the socket to allow a camera support to be positioned at a selected one of a plurality of available positions and orientations. For purposes of this disclosure, a "minority spherical surface" refers to a spherical surface (concave or convex) that is equal to or less than one half of a sphere (less than equal to a semi-spherical surface). One example of a minority spherical surface is a semi-spherical surface. In the form of a socket, the minority spherical surface does not wrap around the ball or portion of the ball such that the ball may be easily withdrawn from the socket. The smaller size of the socket provides a reduced thickness. Likewise, in implementations where the ball is less than an entire ball, such as a semi-spherical ball, the ball has a reduced thickness. The spring retains the ball and the socket in a nested relationship despite the socket being a minority spherical surface and not wrapping about opposite portions of the ball or not capturing the ball. Reducing the thickness of the interface between the camera support and the base may allow the camera mount to more closely hug or align with the profile of the tree or supporting structure such that the camera is less conspicuous to wildlife being observed.

BRIEF DESCRIPTION OF THE DRAWINGS

FIG. 14 is a front view of a component of a camera mount of FIG. 12.

FIG. 15 is a top view of the camera mount of FIG. 12.

FIG. 16 is a top view, with portions broken away, of the camera mount of FIG. 12.

FIGS. 18-21 are top in-use views of the camera mount of FIG. 12.

Figure 1:
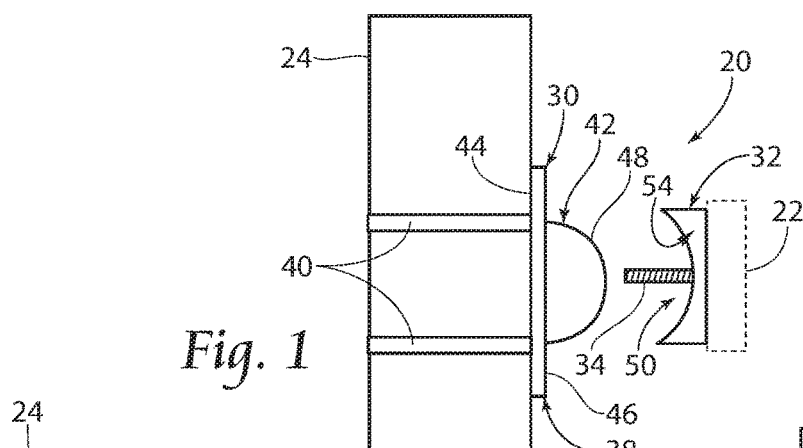
FIG. 1 is the first side view of portions of an example camera mount in a partially disassembled state.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DESCRIPTION OF THE PREFERRED EMBODIMENT

Disclosed herein are example camera mounts that facilitate securement of a camera to a supporting structure, such as a tree, without being restricted or limited by the angle at which the supporting structure or tree (or other supporting structure, such as a post, wall, sticks, or the like) extends. Disclosed herein are example camera mounts that provide the supported camera with a plurality of different available orientations or angles relative to the supporting structure. Disclosed herein are example camera mounts that are easy to assemble and disassemble, that are less complex and costly and that are compact so as to better hug or follow the profile of the tree or supporting structure so as to be less conspicuous to the wildlife being observed.

Disclosed herein are example camera mounts that may include a base member having a rear face to face a support structure and a front face, the front face a curved guide surface, a camera support having a rear face facing the front face of the base member, the rear face of the camera support comprising a guide abutting surface and a spring resiliently biasing the guide abutting surface against the curved guide surface to releasably retain the camera support at one of a plurality of different positions along the curved guide surface and at one of a plurality of different available orientations relative to the support structure.

Disclosed herein are example camera mounts that may include a ball or a portion of a ball and a socket having a minority spherical surface that receives the ball or the portion of the ball, wherein the ball or the portion of the ball rotates within the socket to allow a camera support to be positioned at a selected one of a plurality of available positions and orientations. For purposes of this disclosure, a "minority spherical surface" refers to a spherical surface (concave or convex) that is equal to or less than one half of a sphere (less than equal to a semi-spherical surface). One example of a minority spherical surface is a semi-spherical surface. In the form of a socket, the minority spherical surface does not wrap around the ball or portion of the ball such that the ball may be easily withdrawn from the socket. The smaller size of the socket provides a reduced thickness. Likewise, in implementations where the ball is less than an entire ball, such as a semi-spherical ball, the ball has a reduced thickness. The spring retains the ball and the socket in a nested relationship despite the socket being a minority spherical surface and not wrapping about opposite portions of the ball or not capturing the ball. Reducing the thickness of the interface between the camera support and the base may allow the camera mount to more closely hug or align with the profile of the tree or supporting structure such that the camera is less conspicuous to wildlife being observed.

FIG. 1 is a side view of an example camera mount 20 (shown disassembled or exploded) for securing a camera 22 to a supporting structure, such as a tree 24. Camera mount 20 facilitates securement of camera 22 to a supporting structure, such as tree 24, without being restricted or limited by the angle at which the supporting structure or tree extends. Camera mount 20 provides the supported camera 22 with a plurality of different available orientations or angles relative to the supporting structure. Camera mount 20 is easy to assemble and disassemble, is less complex and costly and is compact so as to better hug or follow the profile of the tree or supporting structure so as to be less conspicuous to the wildlife being observed. Camera mount 20 comprises base 30, camera support 32 and retainer 34.

Base 30 comprises a structure to be removably or releasably mounted to a support structure, such as tree 24. For purposes of this disclosure, the term "releasably" or "removably" with respect to an attachment or coupling of two structures means that the two structures may be repeatedly connected and disconnected to and from one another. Base 30 comprises backing 38, mount 40 and curved guide 42. Backing 30 abuts a side of the tree 24, with the rear face 44 of backing 30 facing tree 24 and a front face 46 facing away from tree 24.

Mount 40 comprise a mechanism to releasably secure backing 38 to tree 24. In one implementation, retainer 44 comprises a pair of straps which encircle the tree 24 and cinch backing 38 to tree 24. In other implementations, mount 40 may comprise other retaining mechanisms such as snaps, screws or the like.

Curved guide 42 extends from backing 44 along the front face 46 of backing 44. Curved guide 42 provides a curved convex surface 48 along which camera support 32 may slide or glide when being moved between different orientations. As will be described hereafter, in some implementations, curved guide 42 may comprise a semicircular disc projecting from backing 38 or a pair of spaced semicircular discs projecting from backing 38, wherein the exterior edge or periphery of the discs form or provide the curved convex surface 48. In some implementations, curved guide 42 may comprise a minority spherical surface, such as a semi-spherical dome. In yet other implementations, curved surface 42 may comprise a sphere or ball.

Camera support 32 comprises a structure that releasably or removably supports a camera 22. In some implementations, support 32 may be permanently affixed or formed as part of camera 22. Camera support 32 has a rear face 50 that faces front face 46 of backing 38. Rear face 50 comprises a guide abutting surface 54. Guide abutting surface 54 contacts the curved guide surface 42 and rides along the curved guide surface 42. In the example illustrated, guide abutting surface 54 comprises a concave surface that substantially mates with the convex surface of surface 42 such that curved guide 42 is partially received or nested within the concave interior of guide abutting surface 54.

In the example illustrated, guide abutting surface 54 comprises a minority spherical surface. The minority spherical surface permits camera support 32 to be slid and rotated along the exterior of curved guide surface 42 between different orientations in which camera 22 faces in different angles with respect to support 24. The minority spherical surface formed a partial socket that enables curved guide 42 be easily withdrawn from the partial socket. The smaller size of the formed socket provides camera mount 32 with a reduced thickness and smaller profile.

Retainer 34 retains camera support 32 against curved guide 42 in the various positions or orientations of camera support 32. In the example illustrated, retainer 34 comprise a tension spring having a first end secured to camera support 34 and a second end to be secured to base 30. In one implementation, retainer 34 is symmetrically positioned with respect to curved guide 42. As a result, retainer 34 does not bias camera support 32 to one side or the other with respect to curved guide 42. In the example illustrated in which retainer 34 comprises a tension spring, retainer 34 automatically adjusts to the changing positions of camera support 32, adjusting to the different distances between camera support 32 and backing 38 as camera support 32 is repositioned along curved guide 42. Because retainer 34 comprises a tension spring, retainer 34 need not be secured to backing 38 at a location equidistant from all points along the curved surface of curved guide 42, facilitating use of the curved guide 42 that is less than semispherical or that extends less than 180°.

In other implementations, portions of retainer 34 may comprise a flexible cable or a link, such as a rod, wherein a flexible cable link is connected in series with at least one tension spring. In some implementations, retainer 34 may be formed wholly from a flexible cable or a link pivotally connected at opposite ends to backing 38 and camera support 32, where the cable or link is pivotally connected to backing 38 at a location equidistant from all surfaces of curved guide 42.

Figure 2:
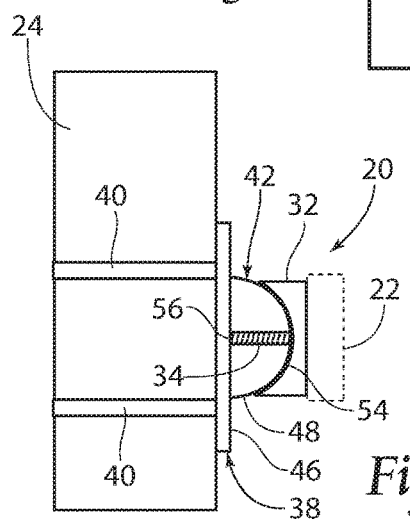
FIG. 2 is a side view illustrating the example camera mount of 1 assembled and in a first example orientation.
Figure 3:
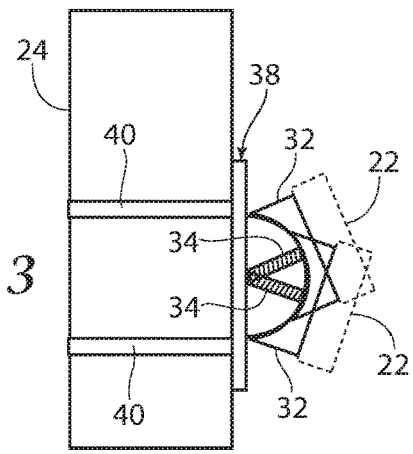
FIG. 3 is a side view illustrating the example camera mount of 1 assembled and in two alternate example orientations.

FIGS. 2 and 3 illustrate camera mount 20 in an assembled state and supported by tree 24. FIGS. 2 and 3 illustrate retainer 34 interconnecting base 30 and camera support 32. In the example illustrated, retainer 34 is connected at or proximate to backing 38 at location 56, behind the curved surface 48 of curved guide 42. As shown by 2 and 3, retainer 34 retains camera mount 32 (and the supported camera 22) against curved surface 48 of curved guide 42 in various positions along curved surface 48 such that camera 22 may be oriented at various possible orientations and angled with respect to tree 24. In the example illustrated, because curved surface 48 extends equal to or less than 180° about its radius center and because guide abutting surface before extends less than or equal to 180° about its radius center, camera mount 20 has a reduced thickness T, allowing camera mount 20 to more closely follow the surface of tree 24 and to be less conspicuous to the wildlife being captured by camera 22.

Figure 4:
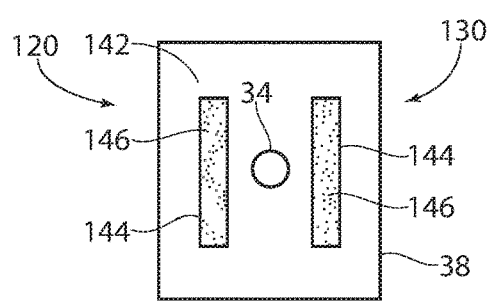
FIG. 4 is a front view of another example camera mount.
Figure 5:
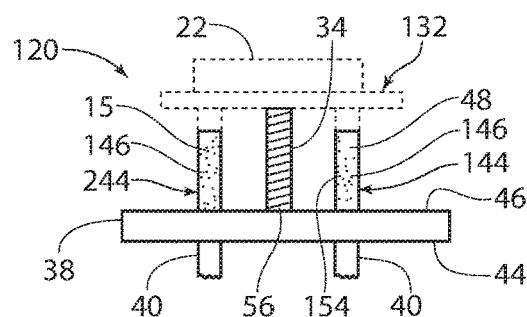
FIG. 5 is a second side view of another example camera mount, a first side view of the example camera mount of FIG. 5 shown in FIGS. 1-3.

FIGS. 4 and 5 illustrate portions of an example camera mount 120. FIG. 4 is a front view of base 130 of camera mount 120. FIG. 5 is a first side view of camera mount 120, with a second side view (perpendicular to the first side view) of camera mount 120 corresponding to what is depicted in FIGS. 1-3. Camera mount 120 comprises base 130 and camera support 132. Those components of camera mount 120 which correspond to components of camera mount 20 are numbered similarly.

Base 130 is similar to base 30 except that base 130 comprises curved guide 142 in the form of a pair of spaced semi-spherical plates or discs 144. Discs 144 have outer edge surfaces 146 that are curved and convex, providing a curved guide surface 48 (described above). In the example illustrated, the outer edge surfaces 146 are textured. In one implementation, the outer edge surfaces 146 have knobs, fingers, ridges, ribs or other high friction structures that assist in retaining camera support 132 in a selected position or orientation with respect to discs 144.

Camera support 132 is similar to camera support 32 except that camera support port 132 comprises guide abutting surfaces 154. Guide abutting surfaces 154 move or slide along outer edge surfaces 146. In the example illustrated, guide abutting surfaces 154 comprise concave edges that abut against the convex edge surfaces 146. In one implementation, guide abutting surfaces 154 have a radius of curvature that corresponds to the radius of curvature of outer edge surfaces 146 for close conformal nesting. In one implementation, guide abutting surfaces 154 are textured. In one implementation, the guide abutting surfaces 154 have knobs, fingers, ridges, ribs or other high friction structures that assist in retaining camera support 132 in a selected position or orientation with respect to discs 144.

Figure 6:
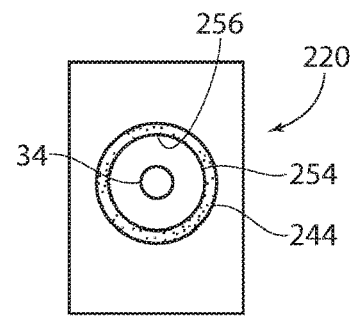
FIG. 6 is a front view of another example camera mount.
Figure 7:
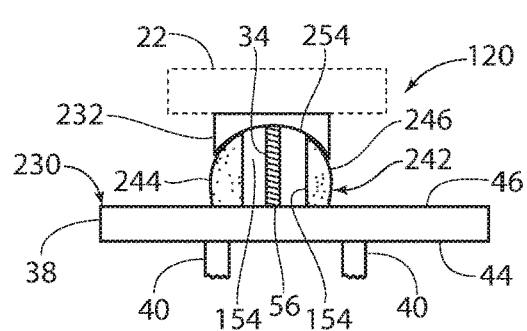
FIG. 7 is a second side view of another example camera mount, a first side view of the example camera mount shown in FIGS. 1-3.

As further shown by FIGS. 4 and 5, retainer 34 is symmetrically positioned with respect to the plates or discs 144. Retainer 34 retains and biases surface 154 against surfaces 146. Retainer 34 changes shape or flexes to accommodate the different angles at which camera support 132 is positioned along outer edge surfaces 146. In one implementation, the semi spherical plates or discs 144 have a radial center points located along a single horizontal axis when backing 38 is supported to tree 24, facilitating repositioning of camera support 130 to different angular positions with respect to the horizontal, pointing further upward or pointing further downward as selected by the user. In other implementations, the semi spherical plates or discs 144 have a radial center points located along a single vertical axis when backing 38 is supported to tree 24, facilitating repositioning of camera support 130 to different angular positions with respect to the vertical, pointing further to the left or pointing further to the right as selected by the user FIGS. 6 and 7 illustrate portions of an example camera mount 220. FIG. 6 is a front view of base 230 of camera mount 220. FIG. 5 is a first side view of camera mount 120, with a second side view (perpendicular to the first side view) of camera mount 220 corresponding to what is depicted in FIGS. 1-3. Camera mount 220 comprises base 230 and camera support 232. Those components of camera mount 120 which correspond to components of camera mount 20 are numbered similarly.

Base 230 is similar to base 30 except that base 230 comprises curved guide 242 in the form of a ball or portion of a ball 244. Ball 244 has an outer spherical surface, providing a curved guide surface 48 (described above). In the example illustrated, the curved guide surface of ball 244 is textured. In one implementation, the outer convex curved guide surface of ball 244 has knobs, fingers, ridges, ribs or other high friction structures that assist in retaining camera support 232 in a selected position or orientation with respect to ball 244. In the example illustrated, ball 244 comprises a portion of a ball having a minority outer convex spherical or rounded surface.

Camera support 232 is similar to camera support 32 except that camera support 232 comprises guide abutting surface 254. Guide abutting surfaces 254 move or slide along outer rounded surfaces of ball 244. In the example illustrated, guide abutting surface 254 comprises a concave crater or minority spherical surface that abut against the convex rounded surface 246. In one implementation, guide abutting surfaces 254 have a radius of curvature that corresponds to the radius of curvature of the outer rounded surfaces 246 for close conformal nesting. In one implementation, guide abutting surface 154 is textured. In one implementation, the guide abutting surface 154 has knobs, fingers, ridges, ribs or other high friction structures that assist in retaining camera support 232 in a selected position or orientation with respect to ball 244.

As further shown by FIGS. 6 and 7, retainer 34 is symmetrically positioned with respect to ball 244. Retainer 34 retains and biases surface 254 against surface 248. Retainer 34 changes shape or flexes to accommodate the different angles at which camera support 232 is positioned along has a mouth 254 leading to a hollow interior 256. Retainer 34 extends within the hollow interior 256 and extends through mouth 254 for connection to camera support 232. In the various positions of camera support 232, retainer 34 extends through different portions of mouth 254. Mouth 254 accommodates the various available positions and orientations of camera support 232.

Figure 8:
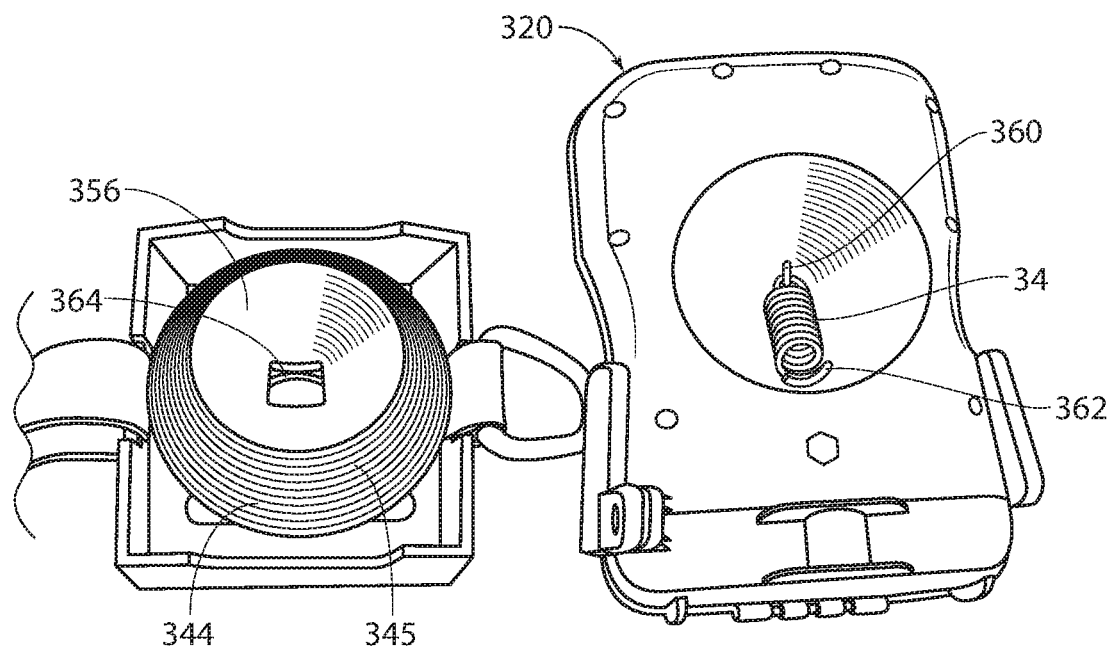
FIG. 8 is an exploded perspective view of another example camera mount.
Figure 9:
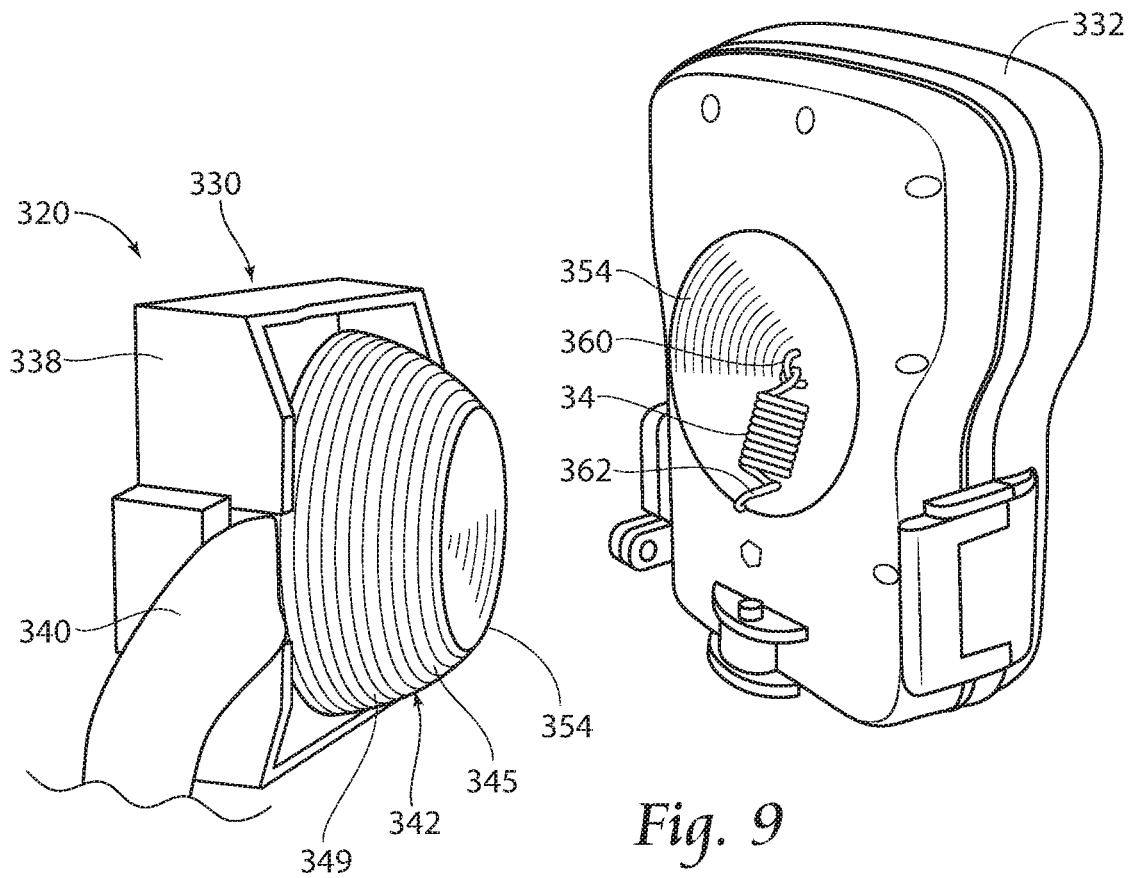
FIG. 9 is an exploded perspective view of the example camera mount of FIG. 8.

FIGS. 8 and 9 illustrate camera mount 320, partially disassembled or exploded. Camera mount 320 is similar to camera mount 220 described above. Camera mount 320 comprises base 330, camera support 332 and retainer 34 (described above). Base 330 is similar to base 230 described above. Base 330 comprises backing 338, mount 340 (described above) and curved guide 342.

Curved guide 342 is similar to curved guide 242 described above. In the example illustrated, curved guide 342 comprises a portion of a ball having an outer convex minority spherical surface 344. In the example illustrated, surface 344 can be textured with circular or annular ribs are ridges 345 that encircle the mouth 354 of ball 344. In one implementation, the outer surface of ball 344 has a radius of at least 2 inches. In another implementation, the outer surface of ball 344 has a radius of at least 3 inches. The radius of the outer surface of ball 344 provides a different angles and orientations for camera support 332 and the supported camera 22 (shown in FIG. 7).

Camera support 332 is similar to camera support 232 described above. Camera support 330 is formed as part of the camera, forming the exterior of the camera. In other implementations, camera support 332 may comprise a clamshell case that encloses a received camera. Camera support 332 further comprises a guide abutting surface 354. Guide abutting surface 354 is similar to guide abutting surface 254 described above. Guide abutting surface 354 is provided by a partial socket that comprises a cavity or crater having an interior concave rounded surface. Guide abutting surface 354 comprise a minority spherical surface such that guide abutting surface 354 does not capture ball 344 within the cavity or crater serving as the partial socket. Because guide abutting surface 354 is provided by a partial socket, camera support 332 may be positioned at a continuum of positions horizontally and vertically providing for adjustment (sideways, upward and/or downward). Because guide abutting surface 354 is provided by a partial socket, rather than a complete socket that captures a ball, camera support 332 may be easily separated from base 334 repair or replacement. Moreover, the overall thickness of camera mount 320 is reduced, allowing camera mount 320 more closely conform to the profile of the tree or other support structure so as to be less conspicuous to wildlife.

As shown by FIG. 8, retainer 34 has a first end 360 secured to a floor of the crater providing guide abutting surfaces 354 and a second end 362 which may be secured to a corresponding hook 364 within the hollow interior 356 of ball 344. Retainer 34 extends from hook 364, through mouth 354 into connection with camera support 320. In the various positions and orientations, retainer 34 extends through different portions of mouth 354 which is larger than the diameter of retainer 34. In one implementation, mouth 354 has a diameter of at least 2 inches. In another implementation, mouth 354 has a diameter of at least 3 inches to accommodate the various orientations of camera support 332 relative to ball 344.

Figure 10:
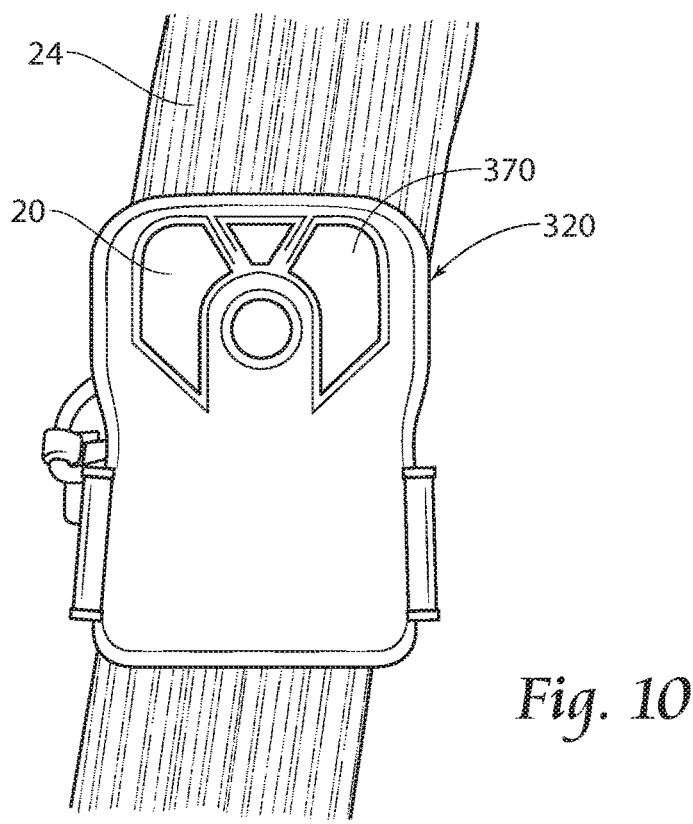
FIG. 10 is a front view of the example camera mount of FIGS. 8-9 assembled and mounted to a tree.
Figure 11:
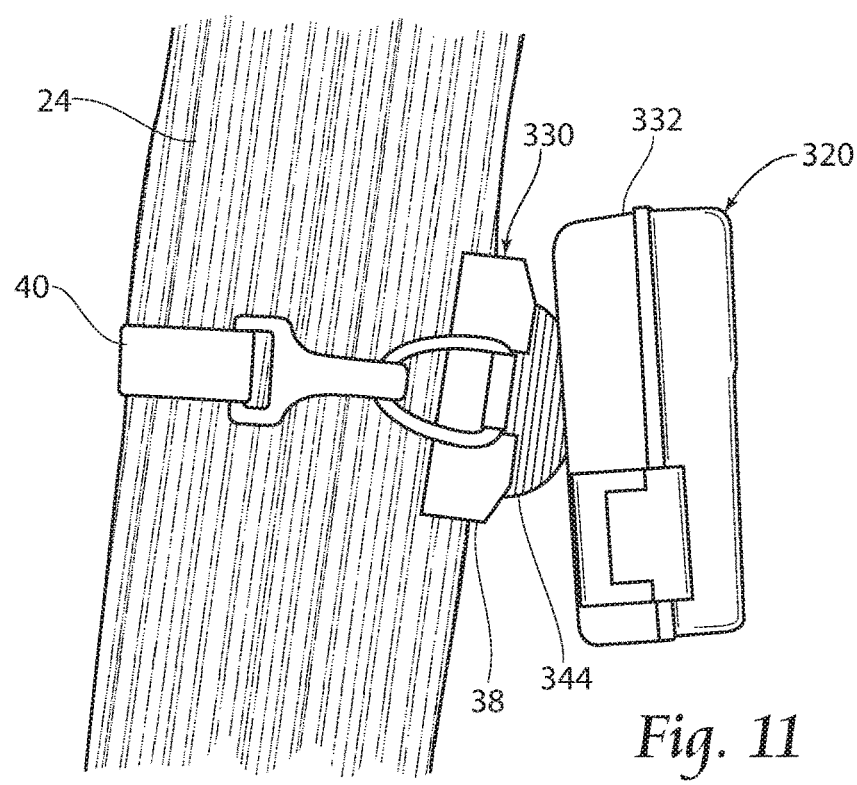
FIG. 11 is a side view of the example camera mount of FIG. 10.

FIGS. 10 and 11 illustrate camera support 320 in an assembled state and mounted to a tree 24. FIG. 10 is a front view of camera support 320 while FIG. 11 is a side view of camera support 321 supported in a first one of a plurality of available positions and orientations relative to tree 24. To adjust the positioning of camera support 320 and the enclosed camera 22 (which captures images through at least one window 370), camera support 320 is pulled against the biased retainer 34 and repositioned about the outer rounded surface of ball 344. Once located in a desired position and orientation, retainer 34 once again urges camera support 332 against ball 344 in the selected position and orientation and retains camera support 332 in the selected position and orientation. Ridges 345 further assist in retaining camera support 332 in the selected position and orientation. In other implementations, ball 344 may have other forms of texturing or maybe form from a compressible rubber-like material to provide high friction so as to assist in retaining camera support 332 in a selected position and orientation.

In each of the above examples, base 30, 130, 230 and 330 is illustrated as comprising a convex curved guide surface in the form of a semicircular or semi-spherical disk or plate or a ball or partial ball while camera support 32, 132, 232, 332 has been illustrated as having the opposite guide abutting surface in the form of a concave plate edge or edges or in the form of a crater forming a partial socket having a minority spherical surface that receives or nests with the guide surface. It should be appreciated that in other implementations, this relationship may be reversed. For example, base 30, 130, 230 and 330 may alternatively support a guide abutting surface in the form of a concave plate edge or edges or in the form of a crater forming a partial socket having a minority spherical surface that receives or nests while camera support 32, 132, 232, 332 comprises a convex curved guide surface in the form of a semicircular or semi-spherical disk or plate or a ball or partial ball.

Figure 12:
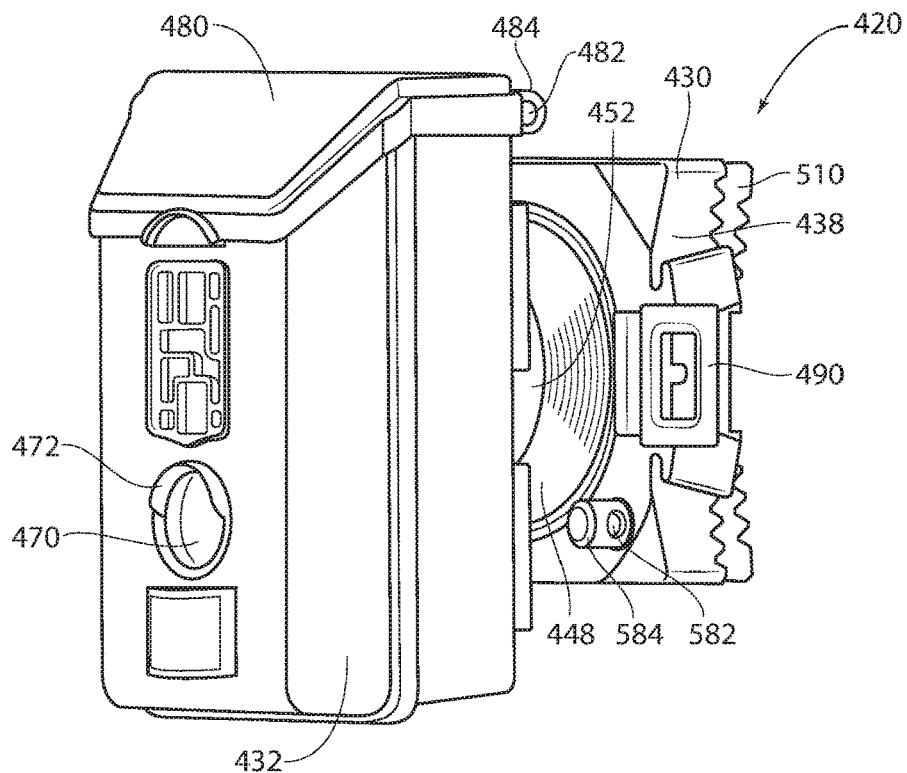
FIG. 12 is a side perspective view of an additional alternate embodiment of a camera mount.

Referring now to FIG. 12, a side perspective view of an additional alternate embodiment of a camera mount 420 is shown. In this embodiment, a secondary base 510 is provided selectively coupled to base member 430. A lock anchor 584 carried by the secondary base 510 is threaded through a void on the base 430, and a lock void 582 can carry a lock such as a padlock (not shown in this view). A strap mounting clip 490 is carried by base 430, and this clip can carry a strap to be coupled about a support structure such as a tree (described later).

Camera support housing 432 carries windows 470 as described previously, preferably covered by bills 472 to assist with preventing rain, debris, and snow buildup. A preferably hinged roof 480 advantageously provides top access to the camera contained within the support housing 432, with hinge pin 462 providing the coupling between the two components.

Figure 13:
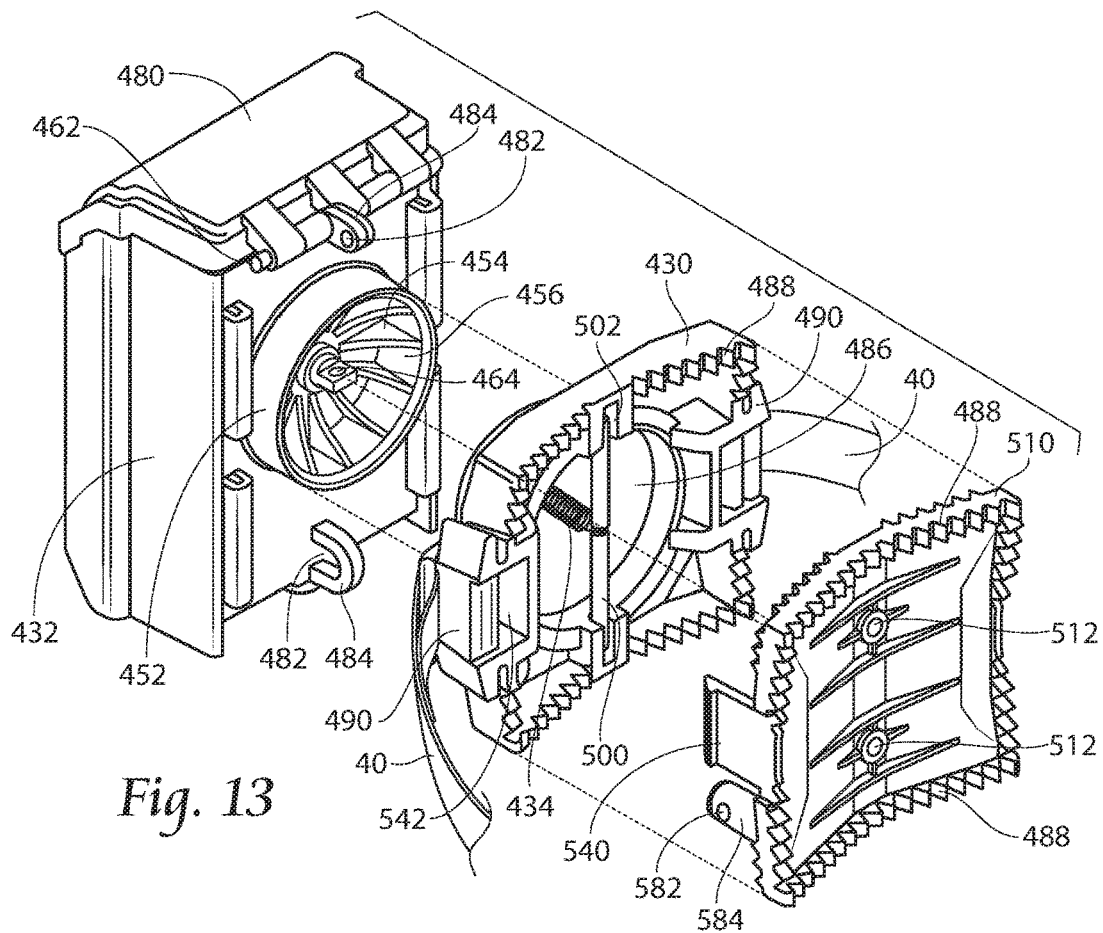
FIG. 13 is an exploded rear perspective view of the camera mount of FIG. 12.

Referring now to FIG. 13, an exploded rear perspective view of the camera mount 420 of FIG. 12 is shown. Hinged roof 480 is hinged by hinge 482. Lock anchor 484 and lock void 482 provide a means for locking hinged roof 480 and preventing access to the camera contained therein. Receiver 542 for convex surface 448 carries a spring hook anchor 464 for receiving receiver 434. Lock void 482 in lock anchor 484 can carry a lock and cable (not shown in this view). Guide abutting surface 454 can comprise a concave series of ridges. In this embodiment, base 430 carries a series of teeth 488 for mating with opposing teeth of secondary base 510. A pair of bar receivers 502 carry a spring retaining bar 500. A user can pull spring retainer 434, disengage bar 500 from receivers 502, and invert the bar through base mouth void 486 to decouple the base 430 from the camera support housing 432. Clip receivers 542 receive secondary base retaining clips 540 carried by the secondary base 510, and pushing inwardly on clips 540 release base 430 from secondary base 510. Inserting clips 540 into receivers 542 clips the base 430 into engagement with the secondary base 510. Strap mounting clips 490 carry strap 40. Optionally, clip receivers 542 can carry ears 544 about which a strap 40' as shown in FIG. 20.

Referring now to FIG. 14, a front view of secondary base 510 is shown. One or more support structure coupling holes 512 receive screws 514, which are conveniently carried, when not in use, by screw clips 520. Similarly, tool 516 is carried when not in use by tool clips 518. Tool 516 is used to screw screws 514 into a support structure such as a tree.

Referring now to FIG. 15, in a top view of the mount 420, teeth 488 from each of the secondary base 510 and base 430 matingly engage. As shown in FIG. 16 which is a top view, with portions broken away, of the camera mount 420, spring retainer 434 is free to move as rotationally sliding engagement occurs during camera adjustment between curved convex surface 448 and its receiver 452.

Figure 17:
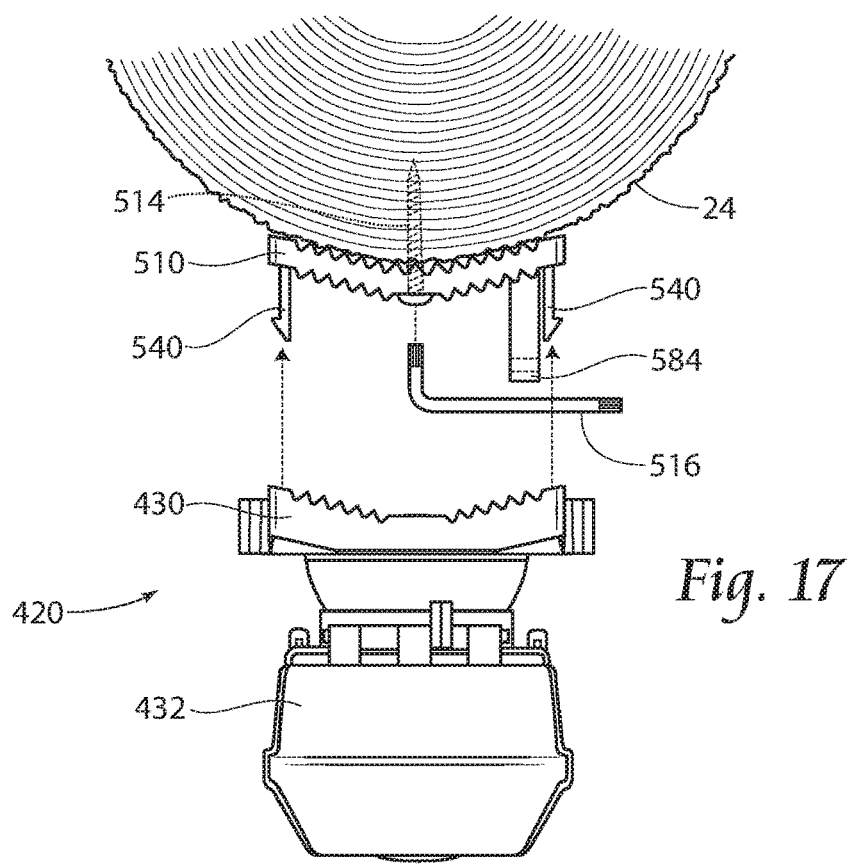
FIG. 17 is a top exploded, in-use view of the camera mount of FIG. 12.
Figure 18:
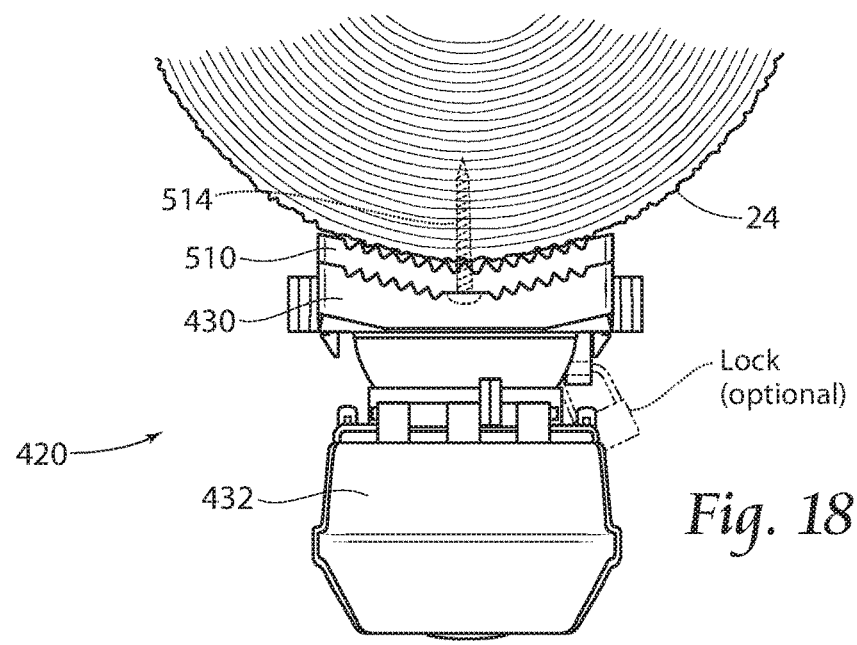

Referring now FIG. 17, a method of installing camera mount 420 is disclosed. First, tool 516 is removed from base 510, and used to screw 514 into a support structure such as tree 24. Tool 516 can then be replaced onto secondary base 510 for safekeeping. Next, as shown in FIG. 18, clips 540 of the secondary base 510 can be inserted into the mount base 430 through clip receivers 542 (not visible in this view). Next, a lock can be optionally installed into lock void 582 to lock the bases 510 and 430 to tree 24. If desired, as shown in FIG. 19, strap 40 can be coupled about tree 24, or as shown in FIG. 20, by clip strap 40'.

Mount 420 can be carried by a structure without a strap (FIG. 18), with a strap using clips (FIG. 19), or using ears 544 (FIG. 20) carrying strap 40'.

Figure 21:
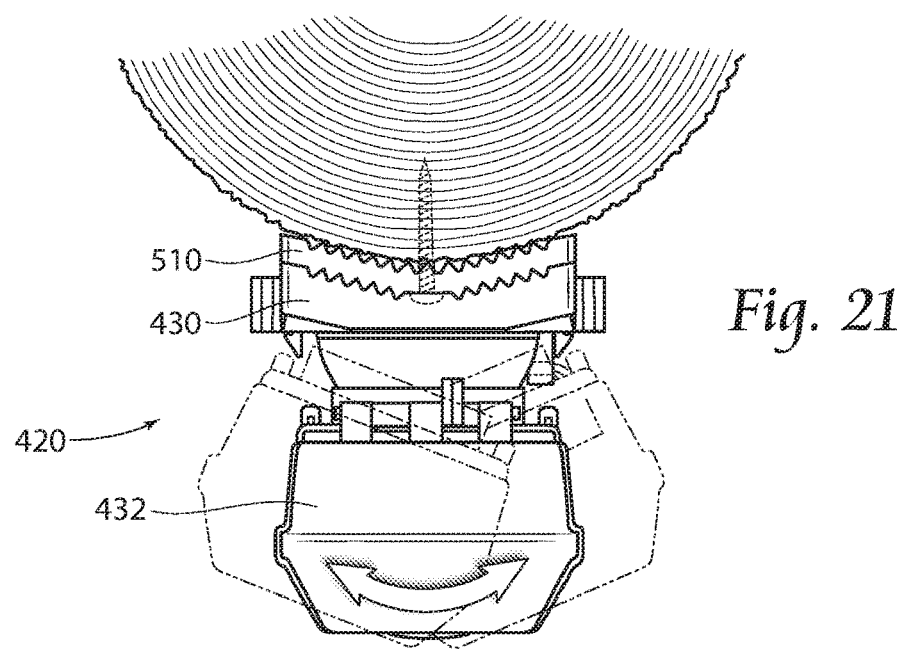
Figure 22:
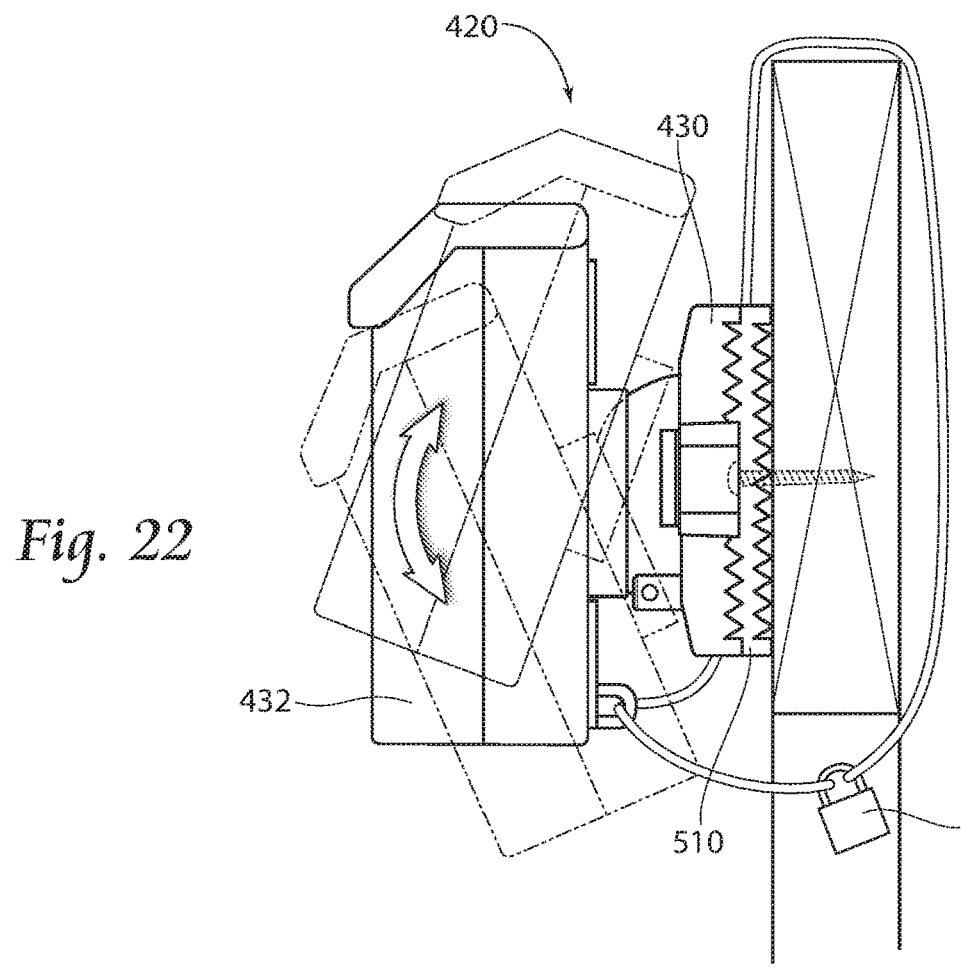
FIG. 22 is a side, in-use view of the camera mount of FIG. 12.

FIGS. 21 and 22 show that mount 420 can be pivoted horizontally and vertically by manipulating mount 420 causing an infinitely variable positioning mechanism. Lock and cable as shown in FIG. 22 can be used to couple the mount to a support structure.

Although the present disclosure has been described with reference to example implementations, workers skilled in the art will recognize that changes may be made in form and detail without departing from the spirit and scope of the claimed subject matter. For example, although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

I claim:

1. A camera mount comprising:
    a base member having a rear face and a front face, the front face comprising a curved guide surface;
    a camera support having a rear face facing the front face of the base member, the rear face of the camera support comprising a guide abutting surface; and
    a retainer holding the guide abutting surface against the curved guide surface to releasably retain the camera support at one of a plurality of different positions along the curved guide surface and at one of a plurality of different available orientations relative to a support structure, wherein the retainer comprises a tension spring;
    wherein the curved guide surface comprises one of (a) at least a portion of a ball and (b) a spherical minority socket and wherein the guide abutting surface comprises the other of (a) the at least a portion of a ball and (b) the semi-spherical socket;
    wherein the portion of the ball has a mouth leading to a hollow interior and wherein the retainer extends through the mouth into hollow interior, the retainer having a first end secured to a rear surface of the hollow interior opposite the mouth and a second end secured to a floor of the spherical minority socket.

2. The camera mount of claim 1, wherein the portion of the ball has an exterior textured surface.

3. The camera mount of claim 2, when the textured surface is formed from a plurality of concentric circumferential ridges encircling the mouth leading to the hollow interior.

* * * * *